US010375405B2

(12) United States Patent
Chen et al.

(10) Patent No.: US 10,375,405 B2
(45) Date of Patent: Aug. 6, 2019

(54) MOTION FIELD UPSAMPLING FOR SCALABLE CODING BASED ON HIGH EFFICIENCY VIDEO CODING

(71) Applicant: QUALCOMM Incorporated, San Diego, CA (US)

(72) Inventors: Ying Chen, San Diego, CA (US); Vadim Seregin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 476 days.

(21) Appl. No.: 14/043,706

(22) Filed: Oct. 1, 2013

(65) Prior Publication Data
US 2014/0098881 A1 Apr. 10, 2014

Related U.S. Application Data

(60) Provisional application No. 61/710,635, filed on Oct. 5, 2012, provisional application No. 61/711,715, filed
(Continued)

(51) Int. Cl.
G06K 9/36 (2006.01)
H04N 19/33 (2014.01)
H04N 19/52 (2014.01)

(52) U.S. Cl.
CPC ............ H04N 19/33 (2014.11); H04N 19/52 (2014.11)

(58) Field of Classification Search
CPC .. H04N 19/00763; H04N 19/52; H04N 19/33; H04N 7/34; H04N 11/02
(Continued)

(56) References Cited

U.S. PATENT DOCUMENTS 7,903,735 B2 * 3/2011 Cha ...................... H04N 19/159
375/240.08
7,924,917 B2 * 4/2011 Park ...................... H04N 19/31
375/240.12
(Continued)

FOREIGN PATENT DOCUMENTS

CN 101385348 A 3/2009
CN 101438596 A 5/2009
(Continued)

OTHER PUBLICATIONS

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); < URL: http://wftp3.itu.int/av-arch/jctvc-site/no.jvtcv-k0036 >, Oct. 2, 2012 (Oct. 2, 2012), XP030112968, pp. 1-22.
(Continued)

Primary Examiner — Zaihan Jiang
(74) Attorney, Agent, or Firm — Shumaker & Sieffert, P.A.

(57) ABSTRACT

An apparatus for coding video information according to certain aspects includes a memory unit and a processor in communication with the memory unit. The memory unit is configured to store video information associated with a first layer having a first spatial resolution and a corresponding second layer having a second spatial resolution, wherein the first spatial resolution is less than the second spatial resolution. The video information includes at least motion field information associated with the first layer. The processor upsamples the motion field information associated with the first layer. The processor further adds an inter-layer reference picture including the upsampled motion field information in association with an upsampled texture picture of the
(Continued)

first layer to a reference picture list to be used for inter prediction. The processor may encode or decode the video information.

41 Claims, 9 Drawing Sheets

Related U.S. Application Data on Oct. 9, 2012, provisional application No. 61/737,674, filed on Dec. 14, 2012.

(58) Field of Classification Search
USPC .................................. 375/240.16, 240.15
See application file for complete search history.

(56) References Cited

U.S. PATENT DOCUMENTS

| | | | |
|---|---|---|---|
| 8,199,816 B2 | 6/2012 | Chen et al. | |
| 8,218,628 B2 | 7/2012 | Schwarz et al. | |
| 8,428,129 B2 | 4/2013 | Wu et al. | |
| 9,860,558 B2* | 1/2018 | Zhang | H04N 19/593 |
| 2006/0133677 A1* | 6/2006 | Park | H04N 19/105 |
| | | | 382/236 |
| 2006/0222067 A1* | 10/2006 | Park | H04N 19/105 |
| | | | 375/240.08 |
| 2008/0260043 A1* | 10/2008 | Bottreau | H04N 19/105 |
| | | | 375/240.26 |
| 2009/0010331 A1* | 1/2009 | Jeon | H04N 19/105 |
| | | | 375/240.12 |
| 2009/0034629 A1* | 2/2009 | Suh | H04H 20/30 |
| | | | 375/240.27 |
| 2009/0060034 A1* | 3/2009 | Park | H04N 19/105 |
| | | | 375/240.12 |
| 2009/0097573 A1* | 4/2009 | Choi | H04N 19/46 |
| | | | 375/240.26 |
| 2009/0103615 A1 | 4/2009 | Francois et al. | |
| 2009/0147848 A1* | 6/2009 | Park | H04N 19/00018 |
| | | | 375/240.13 |
| 2009/0190844 A1* | 7/2009 | Park | H04N 19/56 |
| | | | 382/233 |
| 2009/0310674 A1* | 12/2009 | Le Leannec | H04N 19/33 |
| | | | 375/240.12 |
| 2010/0111167 A1 | 5/2010 | Wu et al. | |
| 2010/0135393 A1* | 6/2010 | Ying Gao | H04N 19/00315 |
| | | | 375/240.15 |
| 2010/0158128 A1* | 6/2010 | Kim | H04N 19/503 |
| | | | 375/240.16 |
| 2011/0122944 A1* | 5/2011 | Gupta | H04N 19/176 |
| | | | 375/240.12 |
| 2012/0057631 A1* | 3/2012 | Le Leannec | H04N 19/56 |
| | | | 375/240.16 |
| 2013/0003833 A1 | 1/2013 | Jang et al. | |
| 2013/0195186 A1* | 8/2013 | Yu | H04N 19/33 |
| | | | 375/240.12 |
| 2013/0235152 A1* | 9/2013 | Hannuksela | H04N 19/597 |
| | | | 348/43 |
| 2013/0329789 A1* | 12/2013 | Wang | H04N 19/463 |
| | | | 19/463 |
| 2014/0010291 A1* | 1/2014 | He | H04N 19/50 |
| | | | 375/240.12 |
| 2015/0063437 A1* | 3/2015 | Murakami | H04N 19/169 |
| | | | 375/240.02 |
| 2015/0163512 A1* | 6/2015 | Cai | H04N 19/593 |
| | | | 375/240.12 |
| 2015/0208092 A1* | 7/2015 | Lee | H04N 19/105 |
| | | | 375/240.12 |

FOREIGN PATENT DOCUMENTS

| | | |
|---|---|---|
| CN | 101601296 A | 12/2009 |
| CN | 102655593 A | 9/2012 |
| TW | 200833124 A | 8/2008 |
| TW | 201132131 A | 9/2011 |
| WO | WO-2014036259 A1 | 3/2014 |

OTHER PUBLICATIONS

Dong J., et al., "Description of scalable video coding technology proposal by InterDigital Communications", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/,, No. JCTVC-K0034, Oct. 1, 2012 (Oct. 1, 2012), XP030112966, pp. 1-28.

Hong D. et al., "Scalability Support in HEVC," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F290, pp. 1-15.

International Search Report and Written Opinion—PCT/US2013/063037—ISA/EPO—dated Nov. 3, 2014.

Hong D, et al., "Scalability Support in HEVC", 2012 IEEE International Symposium on Circuits and Systems (ISCAS), May 20-23, 2012, Seoul, Korea, pp. 890-893.

Taiwan Search Report—TW102136090—TIPO—dated Feb. 26, 2015.

* cited by examiner

MOTION FIELD UPSAMPLING FOR SCALABLE CODING BASED ON HIGH EFFICIENCY VIDEO CODING

CROSS-REFERENCE TO RELATED APPLICATIONS

This application claims priority to U.S. Provisional No. 61/710,635, filed Oct. 5, 2012, to U.S. Provisional No. 61/711,715, filed Oct. 9, 2012, and to U.S. Provisional No. 61/737,674, filed Dec. 14, 2012, each of which is hereby incorporated by reference in its entirety.

TECHNICAL FIELD

This disclosure relates to the field of video coding and compression, scalable coding based on high efficiency video coding (HEVC), and multiview and 3DV coding based on HEVC.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. For SVC, the base layer can carry video data with a base level of quality. The one or more enhancement layers can carry additional video data to support higher spatial, temporal, and/or signal-to-noise SNR levels. Enhancement layers may be defined relative to a previously encoded layer.

For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it.

In the HEVC extension, a current block in the enhancement layer may be predicted using a corresponding block in a base layer. For example, the syntax elements, motion information (e.g. motion vectors) or mode information (e.g. intra mode) of the current block may be based on the corresponding block in the base layer. For example, the motion vectors of a picture in the base layer may be used to predict the motion vector of the current block.

However, the base layer and enhancement layers can have different resolutions. When the two layers have different spatial resolutions, some information (e.g. the motion field of the base layer) may not be readily accessible by the HEVC coding unit level design. By facilitating inter-layer motion prediction in scalable video coding when two layers have different spatial resolutions, the techniques described in this disclosure may improve coding efficiency without significant modification of the block-level modules of HEVC.

The systems, methods and devices of this disclosure each have several innovative aspects, no single one of which is solely responsible for the desirable attributes disclosed herein.

In one embodiment, an apparatus configured to code video information includes a memory unit and a processor in communication with the memory unit. The memory unit is configured to store video information associated with a first layer having a first spatial resolution and a corresponding second layer having a second spatial resolution, wherein the first spatial resolution is less than the second spatial resolution. The video information includes at least motion field information associated with the first layer. The processor is configured to upsample the motion field information associated with the first layer. The processor further adds an inter-layer reference picture including the upsampled motion field information in association with an upsampled texture picture of the first layer to a reference picture list. The processor may further be configured to predict at least a portion of the second layer based on the upsampled motion field information of the inter-layer reference picture. In one embodiment, the video encoder or decoder may use a portion of the inter-layer reference picture as a co-located picture to be used for temporal motion vector prediction (TMVP). In one embodiment, the upsampling of the motion field information may comprise associating at least one of a coding tree, a coding unit, a prediction unit, a mode, an Intra mode, an Inter mode, and an Intra prediction mode with the upsampled texture picture.

In one embodiment, the motion field upsampling is performed separately for each 4×4 block in the inter-layer reference picture of the first layer, and up to two vectors, each associated with a reference index, are derived. In another embodiment, the motion field upsampling is performed separately for each 16×16 block in the inter-layer reference picture of the first layer, and up to two motion vectors, each associated with a reference index, in connection with upsampling the motion field information, are derived.

In one embodiment, for each N×N block in the second layer, a center position of the N×N block is mapped to a unique position corresponding to an N×N block in the first layer, and motion field information of the N×N block in the second layer is derived from the upsampled motion field information associated with the N×N block in the first layer. In one embodiment, N can be at least 16. In one embodiment, each N×N block in the second layer has a particular co-located N×N block in the inter-layer reference picture, and the particular N×N block has a co-located block in the first layer, from which the motion field information is upsampled for the particular N×N block. In one embodiment, the motion field information of the first layer is already compressed based on HEVC motion compression. In one embodiment, the pixel sample with a center position is decided first in the second layer (e.g. for the current block in the enhancement layer) and then mapped to the corresponding position in the first layer (e.g. inter-layer, inter-view or reference picture). In another embodiment, the pixel sample with a center position is first decided for the corresponding block in the first layer and then mapped to the second layer.

In one embodiment, all N×N blocks of the first layer are upsampled with a ratio equal to a ratio of the second spatial resolution to the first spatial resolution. After the motion field information is upsampled and associated with the virtual picture containing the upsampled blocks, the center position of each N×N block in the second layer (e.g. enhancement layer) is directly used to map the block to a corresponding block in the virtual picture. The full set of motion information of the corresponding upsampled block containing the center position is reused for the N×N block in the second layer. In another embodiment, any position (e.g. corner) of the N×N block in the second layer is used to map the block to the base layer picture or the upsampled picture. In one embodiment, when an N×N block is aligned with multiple upsampled blocks from the first layer, reference index selection and motion vector selection may further apply.

In one embodiment, if the initial prediction mode of a first layer block is intra, after the upsampling of the first layer, the intra mode is kept for the first layer block and no motion field is upsampled for the intra block. In another embodiment, regardless of the initial first layer prediction mode, after upsampling, inter prediction mode is assigned to each block along with the upsample motion field information. In another embodiment, the prediction modes of the neighboring blocks are considered in assigning the motion field information and prediction mode information to an upsampled block. For example, in one embodiment, even if a particular block in the first layer is an intra block, inter prediction mode is assigned for the particular block if a majority of neighboring blocks of the particular block have inter prediction mode.

In another embodiment, a method of encoding video information includes: receiving video information associated with a first layer having a first spatial resolution and a corresponding second layer having a second spatial resolution, wherein the first spatial resolution is less than the second spatial resolution, the video information including at least motion field information associated with the first layer; upsampling the motion field information associated with the first layer; and signaling at least one syntax element associated with the second layer in a bitstream. The method may further include adding an inter-layer reference picture including the upsampled motion field information in association with an upsampled texture picture of the first layer to a reference picture list. The method may also include predicting at least a portion of the second layer based on the upsampled motion field information of the inter-layer reference picture.

In another embodiment, a method of decoding video information includes: receiving syntax elements extracted from an encoded video bitstream, wherein the syntax elements comprise video information associated with a first layer having a first spatial resolution and a corresponding second layer having a second spatial resolution, wherein the first spatial resolution is less than the second spatial resolution, the video information including at least motion field information associated with the first layer; and upsampling the motion field information associated with the first layer. The method may further include adding an inter-layer reference picture including the upsampled motion field information in association with an upsampled texture picture of the first layer. The method may also include predicting at least a portion of the second layer based on the upsampled motion field information of the inter-layer reference picture.

In another embodiment, a non-transitory computer readable medium includes code that, when executed, causes an apparatus to: store video information associated with a first layer having a first spatial resolution and a corresponding second layer having a second spatial resolution, wherein the first spatial resolution is less than the second spatial resolution, the video information including at least motion field information associated with the first layer; and upsample the motion field information associated with the first layer. The apparatus may further be caused to add an inter-layer reference picture including the upsampled motion field information in association with an upsampled texture picture of the first layer to a reference picture list. The apparatus may further be caused to predict at least a portion of the second layer based on the upsampled motion field information of the inter-layer reference picture.

In another embodiment, a video coding device configured to code video information includes: means for storing video information associated with a first layer having a first spatial resolution and a corresponding second layer having a second spatial resolution, wherein the first spatial resolution is less than the second spatial resolution, the video information including at least motion field information associated with the first layer; and means for upsampling the motion field information associated with the first layer. The device may further comprise means for adding an inter-layer reference picture including the upsampled motion field information in association with an upsampled texture picture of the first layer to a reference picture list. The device may further comprise means for predicting at least a portion of the second layer based on the upsampled motion field information of the inter-layer reference picture.

DETAILED DESCRIPTION

Figure 1:
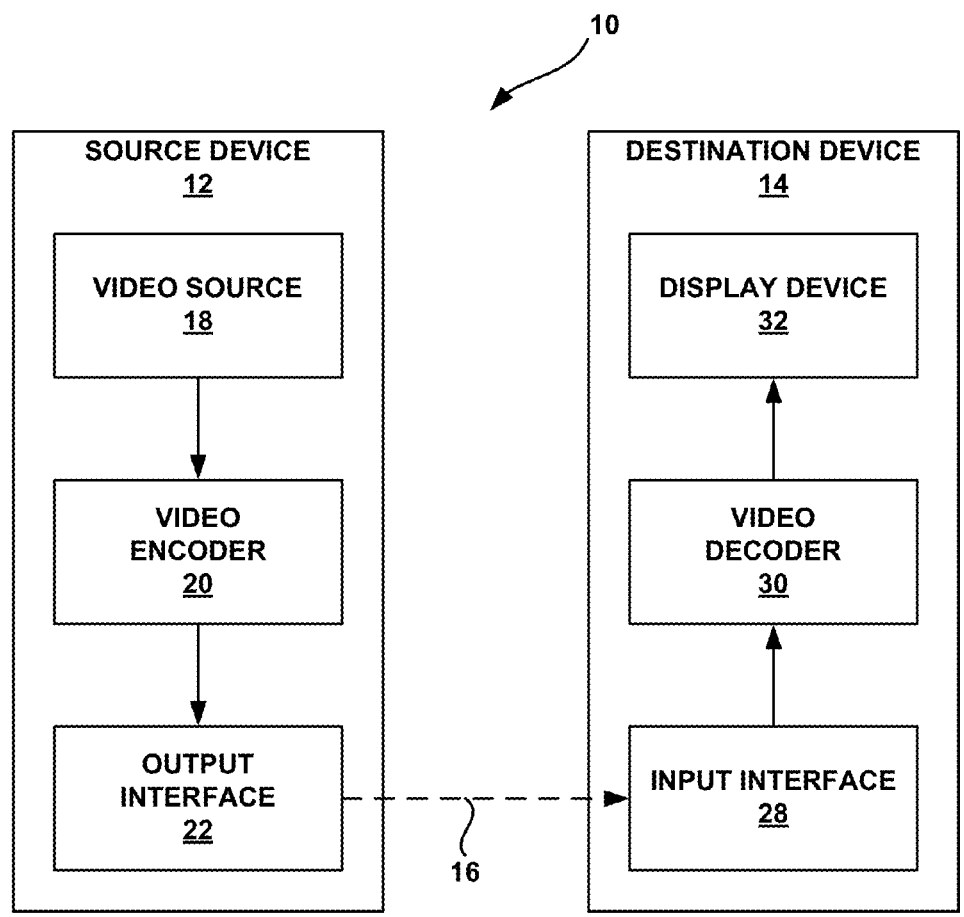
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC. In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, i.e., Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

Video Coding Standards

A digital image, such as a video image, a TV image, a still image or an image generated by a video recorder or a computer, may consist of pixels arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, IS O/IEC MPEG-1 Visual, ITU-T H.262 or ISO/IEC MPEG-2 Visual, ITU-T H.263, ISO/IEC MPEG-4 Visual and ITU-T H.264 (also known as IS O/IEC MPEG-4 AVC), including its Scalable Video Coding (SVC) and Multiview Video Coding (MVC) extensions, all of which are incorporated by reference in their entireties.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.it-sudparis.eu/jct/do-c_end_user/documents/12_Geneva/wg11/JCTVC-L1003-v34.zip, as of Aug. 9, 2013, which is incorporated by reference in its entirety. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and IS O/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (i.e., encode) the treeblocks in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block.

Video encoder 20 may apply one or more transforms to residual video blocks associated with the TUs to generate transform coefficient blocks (i.e., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2:
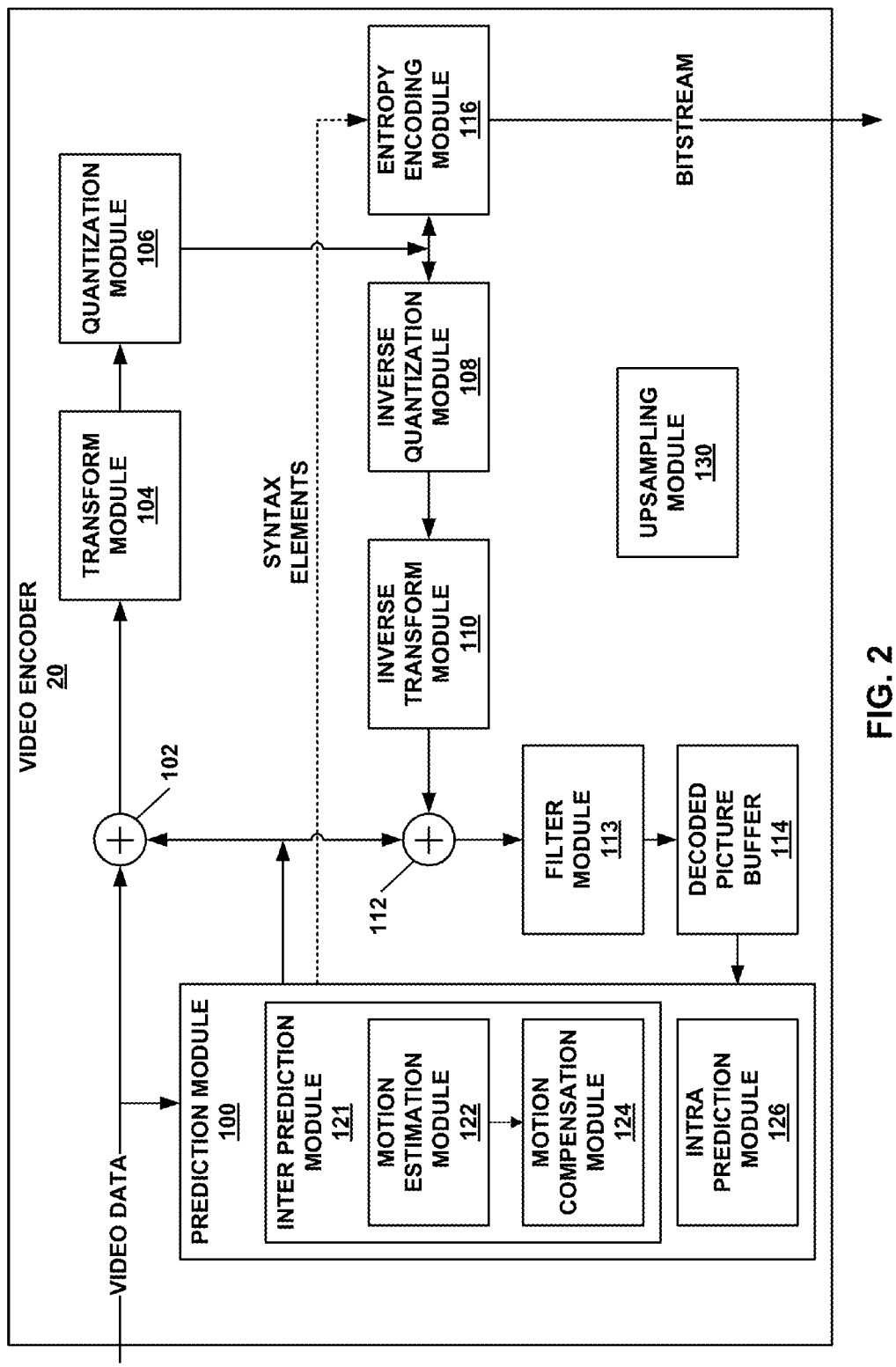
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, inter prediction module 121 and upsampling module 130 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes an inter prediction module 121, motion estimation module 122, a motion compensation module 124, an intra prediction module 126, and an upsampling module 130. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×x2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. To perform inter prediction on a PU, motion estimation module 122 may generate motion information for the PU. Motion compensation module 124 may generate a predicted video block for the PU based the motion information and decoded samples of pictures other than the picture associated with the CU (i.e., reference pictures). In this disclosure, a predicted video block generated by motion compensation module 124 may be referred to as an inter-predicted video block.

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 122 may generate a reference index that indicates the reference picture in list 0 containing the reference block and a motion vector that indicates a spatial displacement between the PU and the reference block. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference index and the motion vector as the motion information of the PU. Motion compensation module 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference block for the PU. Motion estimation module 122 may then generate a reference index that indicates the reference picture in list 0 or list 1 that contains the reference block and a motion vector that indicates a spatial displacement between the PU and the reference block. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predicted video block of the PU based on the reference block indicated by the motion information of the PU.

When motion estimation module 122 performs bi-directional prediction for a PU, motion estimation module 122 may search the reference pictures in list 0 for a reference block for the PU and may also search the reference pictures in list 1 for another reference block for the PU. Motion estimation module 122 may then generate reference indexes that indicate the reference pictures in list 0 and list 1 containing the reference blocks and motion vectors that indicate spatial displacements between the reference blocks and the PU. Motion estimation module 122 may output the reference indexes and the motion vectors of the PU as the motion information of the PU. Motion compensation module 124 may generate the predicted video block of the PU based on the reference blocks indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a syntax structure associated with the PU, a value that indicates to video decoder 30 that the PU has the same motion information as the neighboring PU. In another example, motion estimation module 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes, depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

As further discussed below with reference to FIG. 9, the prediction performed by prediction module 100 may be based at least in part on upsampled motion field information (e.g. determined by upsampling module 130) of a base view/layer. In addition, prediction module 100 may also perform other steps involved in predicting the current (e.g. enhancement) view/layer, such as associating the upsampled motion field information with the upsampled texture picture of the base view/layer and/or adding an inter-prediction reference picture to a reference picture list for inter prediction, which are described below in greater detail with reference to FIG. 9.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

Upsampling module 130 may scale or resample video data, including pixel and non-pixel information such as prediction mode information and/or motion field information, to increase the spatial resolution. In some embodiments, the video data of a base view/layer may be upsampled to match the spatial resolution of an enhancement view/layer. Upsampling module 130 may also coordinate with one or more other functional components of the video encoder 20 to upsample the base view/layer video data of a base layer picture before the base layer picture is inserted into a reference picture list.

Video Decoder

Figure 3:
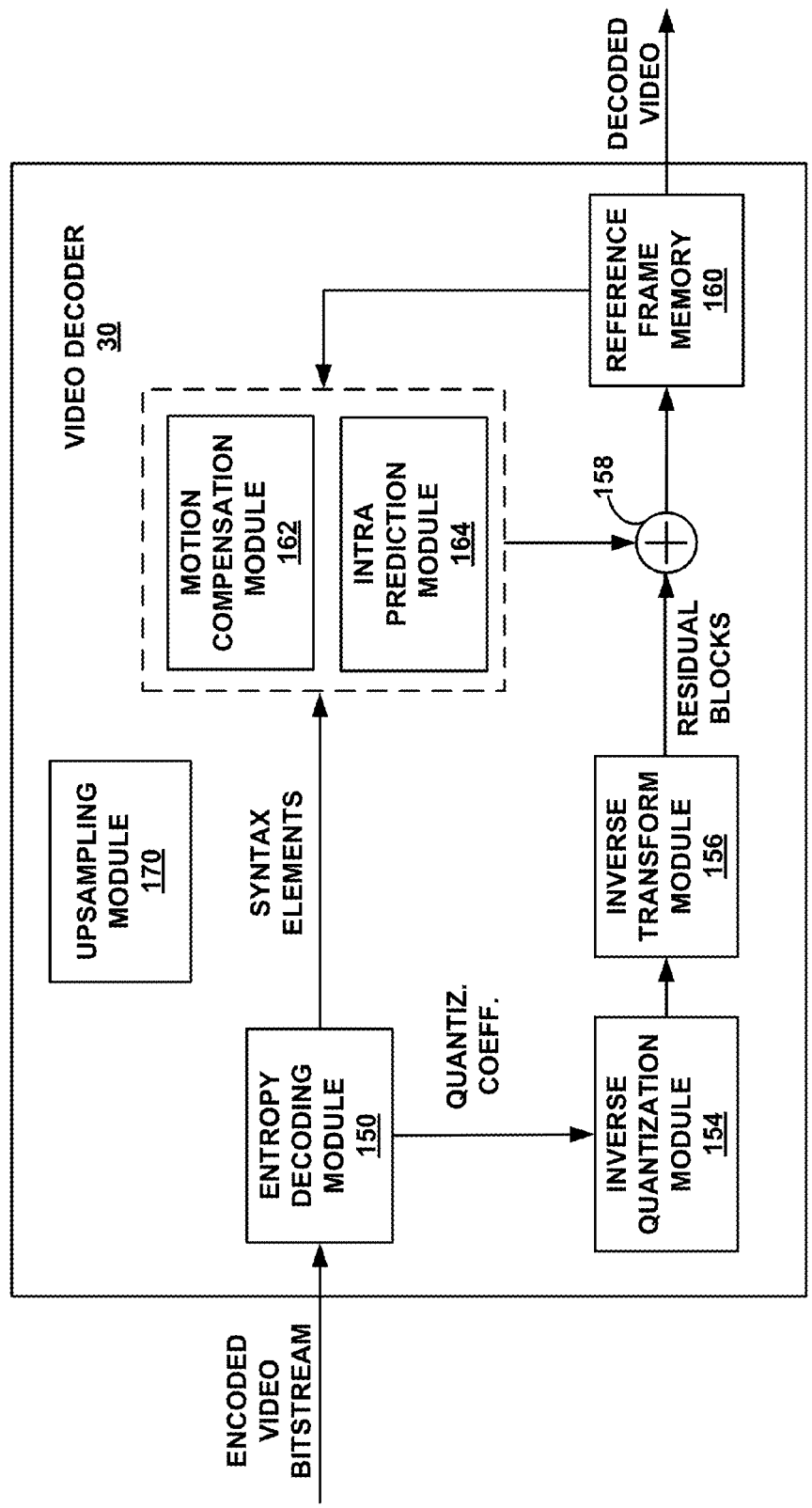
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation module 162 and upsampling module 170 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162, an intra prediction module 164 and an upsampling module 170. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform entropy decoding operations, such as CABAC decoding operations, on syntax elements in the coded slice header to recover the slice header.

As part of extracting the slice data from coded slice NAL units, entropy decoding module 150 may perform parsing operations that extract syntax elements from coded CUs in the slice data. The extracted syntax elements may include syntax elements associated with transform coefficient blocks. Entropy decoding module 150 may then perform CABAC decoding operations on some of the syntax elements.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to determine the intra prediction mode of the PU.

In some instances, the syntax elements may indicate that intra prediction module 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

As discussed above, the prediction performed by the prediction module 152 may be based at least in part on upsampled motion field information of a base view/layer. In addition, prediction module 152 may also perform other steps involved in predicting the current (e.g. enhancement) view/layer, such as associating the upsampled motion field information with the upsampled texture picture of the base view/layer and/or adding an inter-prediction reference picture to a reference picture list for inter prediction, which are described below in greater detail with reference to FIG. 9.

Upsampling module 170 may scale or resample video data, including pixel and non-pixel information such as prediction mode information and/or motion field information, to increase the spatial resolution. In some embodiments, the video data of a base view/layer may be upsampled to match the spatial resolution of an enhancement view/layer. Upsampling module 170 may also coordinate with one or more other functional components of the video decoder 30 to upsample the base view/layer video data of a base layer picture before the base layer picture is inserted into a reference picture list.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction module 158 reconstructs the video block of the CU, filter module 159 may perform a deblocking operation to reduce blocking artifacts associated with the CU. After filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Multiview Video Coding

Figure 4:
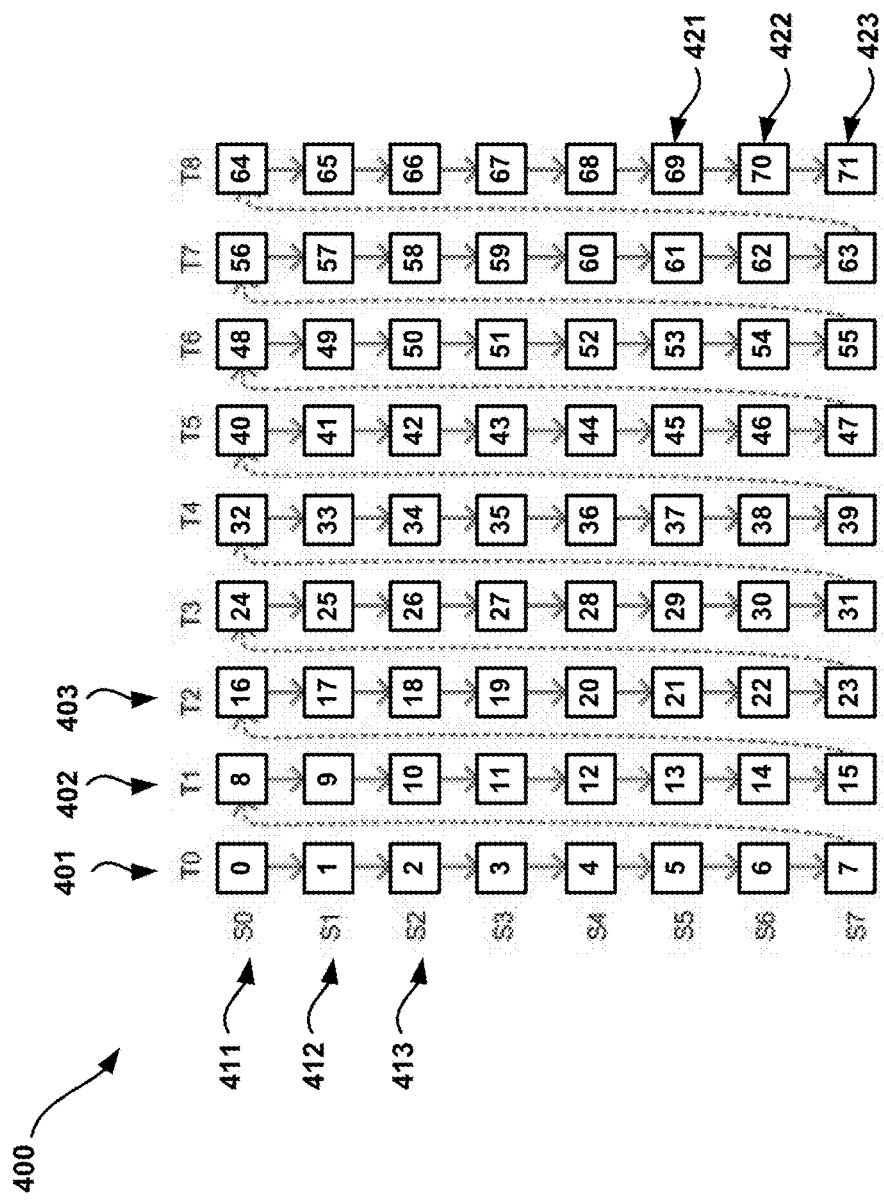
FIG. 4 is a sample diagram illustrating time-first coding.

Multiview video coding (MVC) is an extension of H.264/AVC. A typical MVC decoding order (e.g., a bitstream order) is shown in FIG. 4. The diagram 400 includes access units 401, 402 and 403, views 411, 412 and 413, and coded pictures 421, 422 and 423. For the sake of brevity, not all the access units, views and coded pictures shown in FIG. 4 are labeled. The decoding order arrangement shown in FIG. 4 is referred to as time-first coding. Each access unit (e.g., vertical column T0, T1, . . . T8) is defined to contain coded pictures of all the views (e.g., S0, S1, . . . S7) for one output time instance. The decoding order of the access units may not be identical to the output or display order.

Figure 5:
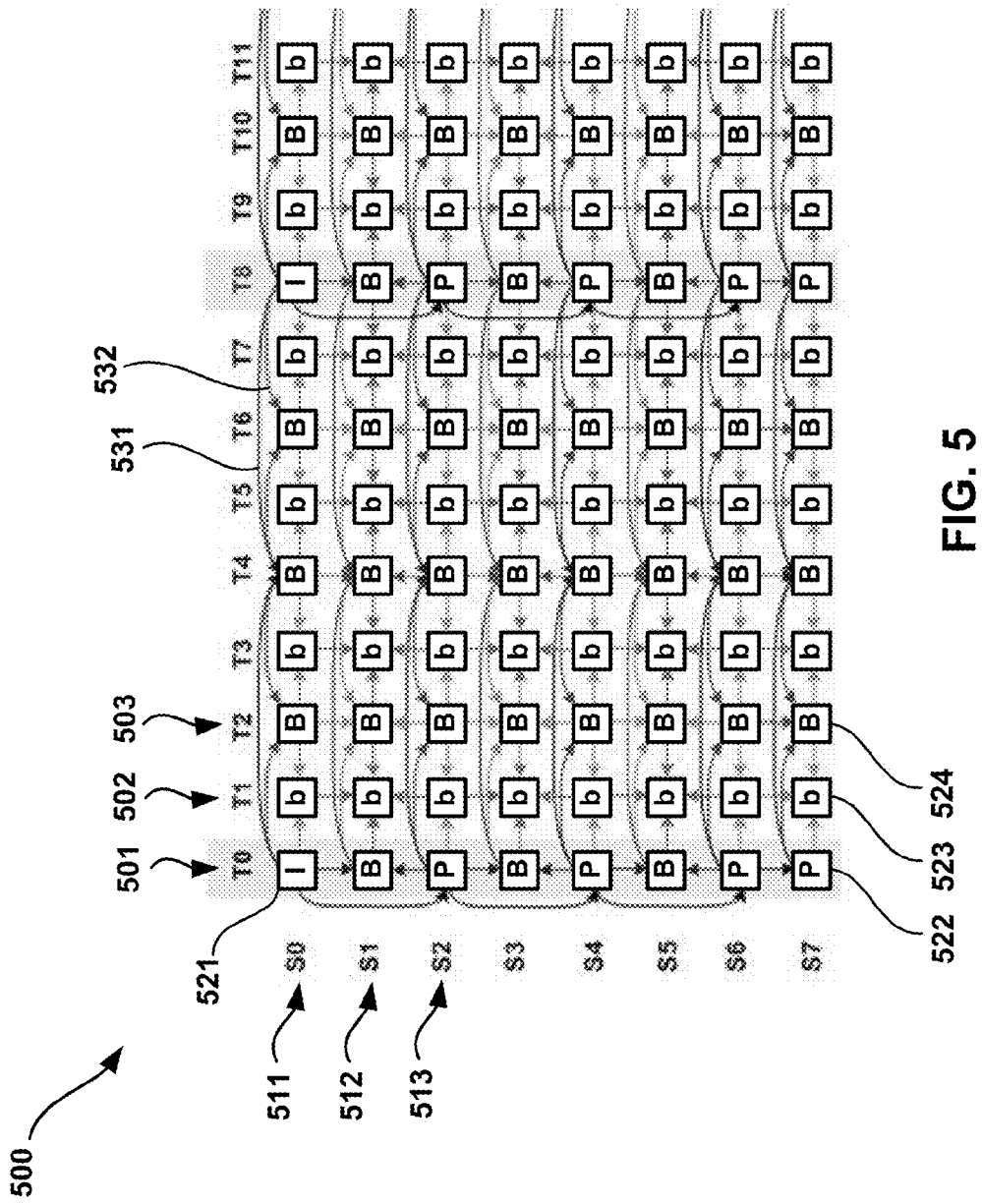
FIG. 5 is a sample diagram illustrating a Multiview Video Coding (MVC) temporal and inter-view prediction structure.

A typical MVC prediction (including both inter-picture prediction within each view and inter-view prediction) structure for multi-view video coding is shown in FIG. 5. The diagram 500 includes access units 501, 502 and 503, views 511, 512 and 513, and coded pictures 521, 522, 523 and 524. For the sake of brevity, not all the access units, views and objects shown in FIG. 5 are labeled. Predictions are indicated by arrows (e.g. arrows 531 and 532), wherein each pointed-to object uses the associated point-from object for prediction reference. In MVC, inter-view prediction is supported by disparity motion compensation. Disparity motion compensation uses the syntax of H.264/AVC motion compensation, but allows a picture in a different view (e.g., a different row S0 . . . S7, etc.) to be used as a reference picture.

Coding of multiple views is also supported by MVC. One advantage of MVC is that an MVC encoder can take more than two views as a 3D video input and an MVC decoder can decode such a multiview representation. Therefore, a renderer with an MVC decoder may expect 3D video contents with more than two views.

In MVC, inter-view prediction is allowed among pictures in the same access unit (e.g., with the same time instance). When coding a picture in one of the non-base views, a picture may be added into a reference picture list if it is in a different view but has the same time instance. An inter-view prediction reference picture can be put in any position of a reference picture list, just like any inter prediction reference picture.

HEVC Techniques

1. Reference Picture List Construction

Typically, a reference picture list construction for the first or the second reference picture list of a B picture includes two steps: (1) reference picture list initialization and (2) reference picture list reordering (modification). The reference picture list initialization is an explicit mechanism that puts the reference pictures in the reference picture memory (also known as the decoded picture buffer or DPB) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position if the picture does not exist in the initialized list.

After the reference picture list reordering/modification, some pictures may be placed in a position very far down the list. However, if a position of a picture exceeds the number of active reference pictures of the list, the picture is not considered as an entry of the final reference picture list. The number of active reference pictures of maybe signaled in the slice header for each list. After reference picture lists are constructed (e.g., RefPicList0 and RefPicList1, if available), a reference index can be used to identify a picture in any reference picture list.

2. TMVP

Temporal Motion Vector Prediction (TMVP) is used to improve the coding efficiency of HEVC. TMVP accesses the motion vector of a frame in a decoded picture buffer, more specifically, in a reference picture list.

In an inter predicted slice, when the TMVP is enabled for the whole coded video sequence (e.g., sps_temporal_mvp_enable_flag in sequence parameter set is set to 1), slice_temporal_mvp_enable_flag is signaled in the slice header to indicate whether TMVP is enabled for the current slice. When TMVP is enabled for the current slice, if the current picture is a B slice, a collocated_from_l0_flag is signaled in the slice header to indicate whether the co-located picture is from RefPicList0 or RefPicList1 .

After a reference picture list is identified, collocated_ref_idx, which is signaled in the slice header, is used to identify the picture in the picture in the list. A co-located prediction unit (PU) is then identified by checking the co-located picture. Either the motion of the right-bottom PU of the coding unit (CU) containing this PU or the motion of the right-bottom PU within the center PUs of the CU containing this PU is used.

3. Random Access in HEVC

There are four picture types that can be identified by the network abstraction layer (NAL) unit type in HEVC. These are the instantaneous decoding refresh (IDR) picture, the clean random access (CRA) picture, the temporal layer access (TLA) picture and the coded picture that is not an IDR, CRA or TLA picture.

The IDR and the coded pictures are picture types similar to those used in the H.264/AVC specification. The CRA and the TLA picture types are new in HEVC and not available in the H.264/AVC specification. The CRA picture is a picture type that facilitates decoding beginning from any random access point in the middle of a video sequence in a manner that is more efficient than inserting IDR pictures. In HEVC, the bitstream starting from these CRA pictures are also conforming bitstreams. The TLA picture is a picture type that can be used to indicate valid temporal layer switching points. The following sections describe the CRA and TLA pictures in further detail.

In video applications, such as broadcasting and streaming, users often wish to switch between different channels and to jump to specific parts of a video broadcast or stream with minimum delay. This feature is enabled by having random access pictures at regular intervals in the video bitstreams. The IDR picture, specified in both H.264/AVC and HEVC can be used for random access. However, since an IDR picture starts a coded video sequence and always cleans the decoded picture buffer (DPB), the pictures following the IDR in decoding order cannot use pictures decoded prior to the IDR picture as reference. Consequently, bitstreams relying on IDR pictures for random access can have significantly lower coding efficiency (e.g., 6%). To improve the coding efficiency, the CRA pictures in HEVC allows pictures that follow the CRA picture in decoding order, but precede it in output order to use pictures decoded before the CRA picture as reference.

Figure 6:
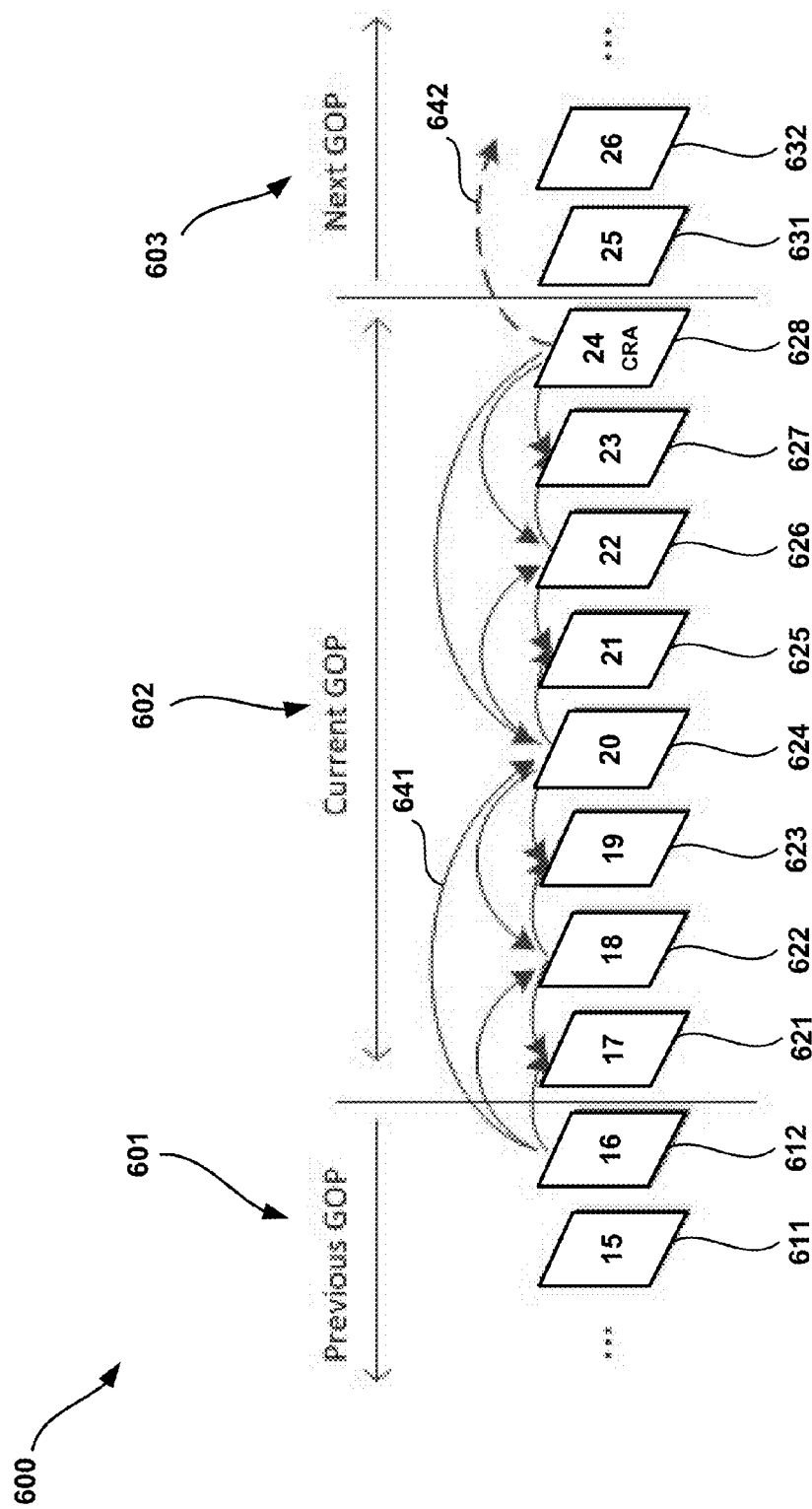
FIG. 6 is a sample diagram illustrating a clean random access (CRA) picture and leading pictures.

A typical prediction structure around a CRA picture is shown in FIG. 6. The diagram 600 illustrates previous Group of Pictures (GOP) 601, current GOP 602, and next GOP 603. In the diagram 600, pictures 611 and 612 belong to the previous GOP 601, pictures 621-628 belong to the current GOP 602, and pictures 631 and 632 belong to the next GOP 603. As discussed in connection with FIG. 5, predictions are indicated by arrows (e.g. arrows 641 and 642), wherein each pointed-to picture uses the associated point-from picture for prediction reference. The CRA picture having a POC of 24 (i.e. picture 628) belongs to the current GOP 602, which contains other pictures 621-627 (having POC of 17 through 23) following the CRA picture in decoding order but preceding the CRA picture in output order. These pictures (e.g. pictures 621-627) are called leading pictures of the CRA picture (e.g. picture 628) and can be correctly decoded if the decoding starts from an IDR or CRA picture before the current CRA picture. However, leading pictures cannot be correctly decoded when random access from this CRA picture occurs; hence these leading pictures are typically discarded during the random access decoding.

To prevent error propagation from reference pictures that may not be available depending on where the decoding starts, all pictures in the next GOP 603 (as shown in FIG. 6) that follow the CRA picture both in decoding order and output order, do not use any picture that precedes the CRA picture either in decoding order or output order (which includes the leading pictures) as reference.

Similar random access functionalities are supported in H.264/AVC with the recovery point SEI message. An H.264/AVC decoder implementation may or may not support the functionality. In HEVC, a bitstream starting with a CRA picture is considered as a conforming bitstream. When a bitstream starts with a CRA picture, the leading pictures of the CRA picture may refer to unavailable reference pictures and hence cannot be correctly decoded. However, HEVC specifies that the leading pictures of the starting CRA picture are not output, hence the name "clean random access". For establishment of bitstream conformance requirement, HEVC specifies a decoding process to generate unavailable reference pictures for decoding of the non-output leading pictures. However, conforming decoder implementations do not have to follow that decoding process, as long as it can generate identical output compared to when the decoding process is performed from the beginning of the bitstream.

In HEVC, a conforming bitstream may contain no IDR pictures at all, and consequently may contain a subset of a coded video sequence or an incomplete coded video sequence.

Besides the IDR and CRA pictures, there are other types of random access point pictures, e.g., BLA. For each of the major types of the random access point pictures, there can be sub-types, depending on how a random access point picture could be potentially treated by systems. Each sub-type of random access point picture can have a different NAL unit type.

4. Motion Compression in HEVC

In order to enable the decoder to be implemented in a way that a smaller decoded picture buffer (DPB) is required, motion compression is introduced in HEVC, to compress the motion field in a way that each block of a picture if in a 16×16 block raster scan order, hypothetically contains a same first motion vector (if available) for RefPicList0 and a same second motion vector (if available) for RefPicList1. The motion compression applies to all temporal reference pictures so that the DPB size can be noticeably decreased.

In this disclosure, each of the 16×16 blocks is referred to as an "aligned 16×16 block". In the current HEVC specification, however, motion field is done in real-time in a way that when accessing any 4×4 block inside an aligned 16×16 block, the motion vector of the top-left corner block within the aligned 16×16 block is used. This design under the current HEVC specification requires CU-level processes to handle the motion compression real-time, although a smart decoder might do it in the picture level.

MV-HEVC in .TCT-3V

In order to implement the aforementioned HEVC concepts to Multiview HEVC (MV-HEVC), a multiview extension of HEVC, coding unit level or lower level changes may be required.

1. Random Access in MV-HEVC

The random access concept of HEVC is extended to the multiview and 3DV extensions. Detailed definitions of the random access point access units as well as the random access view component are described in the MV-HEVC working draft specification, JCT3V-A1004, which is incorporated by reference in its entirety. In addition, detailed definitions of the random access point access units as well as the random access view component are also in the MV-HEVC working draft specification: JCT3V-A1004 (Gerhard Tech, Krzysztof Wegner, Ying Chen, Miska Hannuksela, "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, which is incorporated by reference in its entirety).

Whether a view component is a random access point or not depends on the NAL unit type of the view component. If the type belongs to those defined in HEVC base specification for random access point pictures, the current view component is a random access point view component (or for simplicity, random access point picture of the current view).

The random access functionality only applies to the temporal prediction in a way that certain predictions in the temporal dimension (thus for a single view) are either disabled or constrained similarly as in HEVC base specification. However, inter-view prediction for a random access point view component is still possible, and typical, to improve the coding efficiency, similar to the anchor picture in H.264/MVC. A random access point (RAP) view component, if it uses inter-view prediction, may be a P or B picture.

This concept can be extended to the scalable extension of HEVC or "toward HEVC" multi-standard codec, as described below.

2. Inter-View Reference Picture Set

An inter-view reference picture set can be created based on a view dependency signaled in a video parameter set (VPS). For a current picture, pictures that are in the same access unit and belong to the dependent views (signaled in VPS) form an inter-view reference picture set. A picture in an inter-view reference picture set may be used to be added into a reference picture list of the current picture.

High Level Syntax-Only (HLS-only) HEVC Based Scalable Coding

In an HLS-only HEVC, if the two spatial layers have the same spatial resolution, it can be supported similar to MV-HEVC, wherein TMVP is enabled even when the co-located picture is from a different view. Note that the base layer picture (after possible upsampling/filtering) is added as a reference picture in a reference picture list.

Inter-Layer/View Motion Prediction

Figure 7:
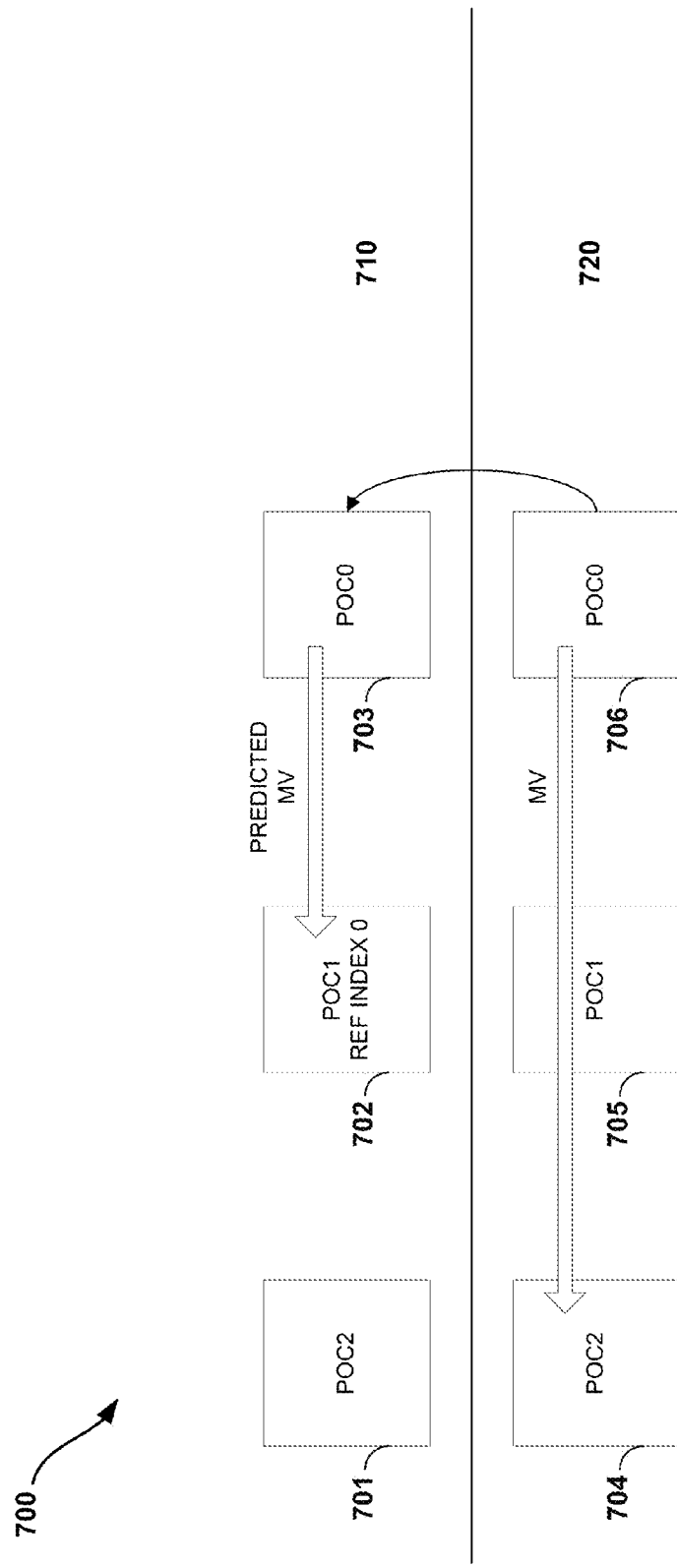
FIG. 7 is an example of inter-view/layer motion prediction using HEVC design.

With the current HEVC design, inter-layer/view motion prediction can be enabled by using the reference layer/view picture in the reference picture list as a co-located picture. An example of the inter-view/layer motion prediction using the HEVC design is shown in FIG. 7. Diagram 700 illustrates pictures 701-703 in current view/layer 710 (e.g. enhancement layer), and pictures 704-706 in reference view/layer 720 (e.g. base layer). The current picture 703 has a POC equal to POC0 in the current view 710. The base view/layer picture 706 is signaled as the co-located picture (by the syntax elements in the slice header) and a motion vector of a co-located block in this picture, denoted as MV, is used as a candidate to predict the motion vector of the current prediction unit (PU) (e.g. predicted MV). In this case, the picture 706 in the base view/layer 720 is not only in the reference picture list, but also in the reference picture list as a co-located picture (e.g., RefPicListX[collocated_ref_idx], with X equal to collocated_from_10_flag).

In the multiview case, however, the co-located PU may be located by using a disparity vector, rather than using the methods defined in HEVC. In another embodiment, inter-view motion prediction can be performed transparently to the disparity vector, thus in the same way as in HEVC, in terms of accessing the co-located PU.

Multiple Layers having Different Spatial Resolutions

The embodiments below describe devices, systems, and methods to support inter-layer motion prediction in scalable video coding when two layers have different spatial resolutions without coding unit level or low level changes.

In one embodiment, the motion field of the base view/layer picture is upsampled and associated with the upsampled texture picture of the base view/layer, such that an inter-layer reference picture, which includes both texture (i.e. sample pixels) and motion vectors can be used by the HEVC temporal motion vector prediction design transparently, without any modifications. For example, the motion field of the base view/layer picture may be a set of motion vectors, wherein each motion vector corresponds to a pixel in the base view/layer picture. The motion field upsampling may be performed in the picture level before the inter-layer reference picture is added into a reference picture set or reference picture list. For example, the upsampled motion field may be stored in the inter-layer reference picture in association with the upsampled texture picture. Such inter-layer reference picture may include all necessary information as a regular temporal reference picture and thus can be added to the reference picture list and be used for inter-prediction of the enhancement view/layer. The inter-layer reference picture can be added to or replace another picture in one or more reference lists. In an embodiment, the upsampling of the motion field matches the upsampling of the base view/layer picture, such that both are upsampled according to the same spatial aspect ratio.

The motion field upsampling may also include the coding tree, coding unit and prediction unit upsampling, such that the upsampled coding tree, coding unit and prediction unit are compliant with the HEVC design. The motion field upsampling may also include the upsampling of the modes, e.g., Intra/Inter, Intra prediction modes such that the upsampled modes are associated with the coding unit in a way that is compliant with the HEVC design. In other words, the modes are also associated with the upsampled texture picture of the base view/layer.

Motion field upsampling may be performed such that each 4×4 block of the target inter-layer reference picture is performed separately, and up to two motion vectors, each associated with a reference index, are derived. Alternatively, the upsampling may be performed such that each 16×16 block of the target inter-layer reference picture is performed separately, and up to two motion vectors, each associated with a reference index, are derived.

For each current N×N (e.g., with N being equal to 4 or 16, or generally any size) block of the picture, the center position of the block is mapped to a unique position of the base layer picture, and the motion information of the N×N block of the base layer covering the mapped position is directly used to derive the motion information. This pixel sample with the center position may be decided first in the current frame (for example, EL) and be mapped to the corresponding or co-located position in the inter-layer/inter-view block or reference picture. Alternatively, the pixel sample with the center position may be decided for inter-layer/inter-view corresponding or co-located block and be mapped to the current (for example, EL) block. Depending on the spatial resolution, these two approaches may result in different motion field mappings.

When 16×16 is used, the motion field has already been compressed as described in HEVC to the granularity of 16×16, such that each 16×16 has at maximum one motion vector corresponding to RefPicListX (with X equal to 0 or 1). In one embodiment, during the mapping of the center pixel, when the mapped pixel position is in a sub-pel position, it is rounded to the right and bottom integer sample position. The mapped center pixel may be further shifted by 1 for both vertical and horizontal components. In one embodiment, any position of the current N×N block (e.g. any corner of the block) is chosen to be mapped to the base layer picture. Alternatively, any position outside of the current N×N block may be chosen to be mapped to the base layer picture.

Figure 8:
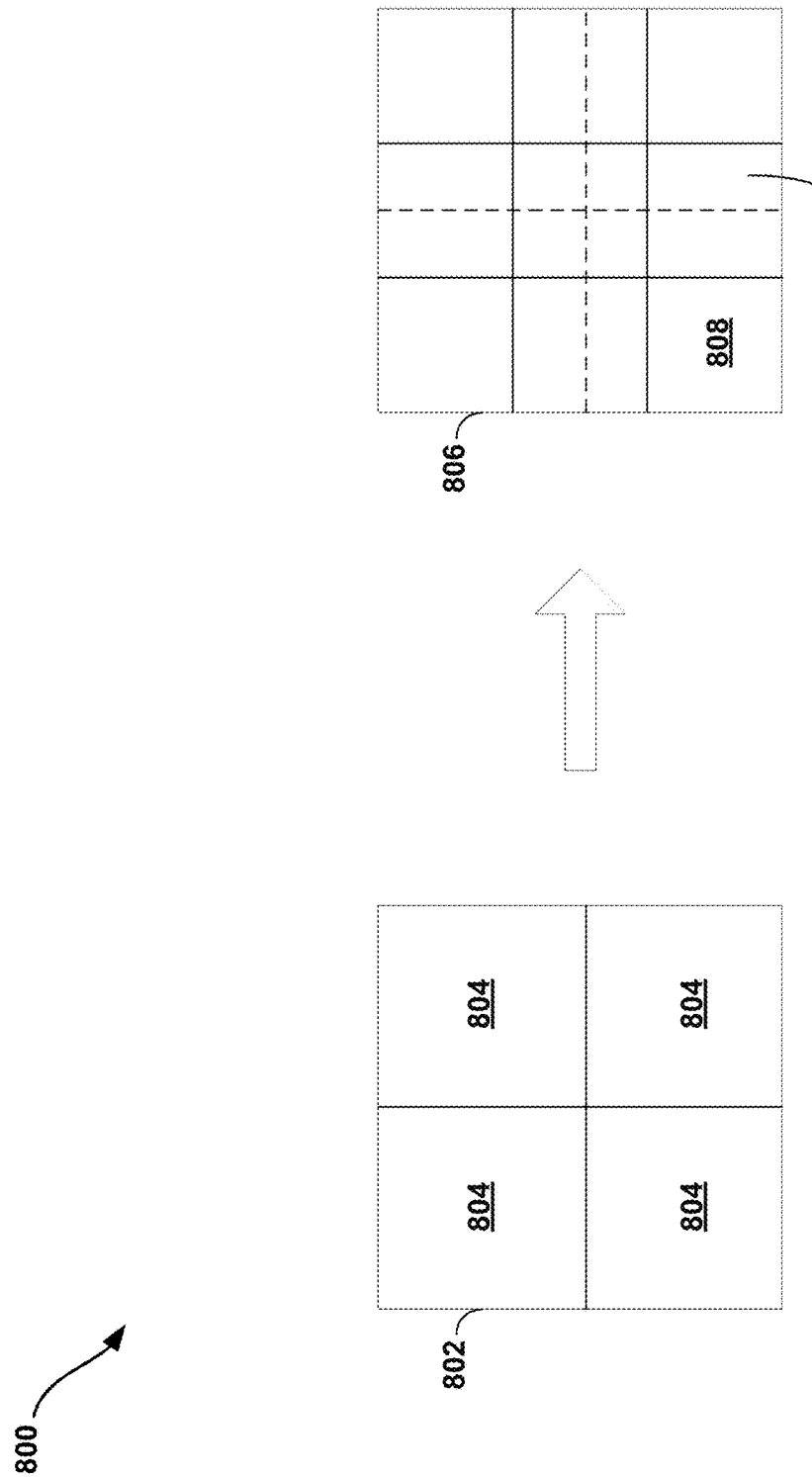
FIG. 8 is an example illustrating motion field upsampling.

In another embodiment, all base layer N×N blocks are upsampled with a ratio equal to the spatial resolution ratios of the two layers. For example, if N is equal to 4 and the ratio is 1.5, in the upsampled structure (e.g. upsampled base layer picture 802 shown in diagram 800 of FIG. 8), each upsampled block 804, e.g., 6×6 block, contains a full set of motion information and at maximum one motion vector corresponding to RefPicListX (with X equal to 0 or 1). After the base layer motion structure is upsampled, for each current N×N block of the picture, the center position is directly used in the virtual picture containing the upsampled blocks, e.g., 6×6 blocks. The full set of motion information of the upsampled block containing the center position is reused for the current N×N block (e.g. block 808 in the current layer 806 shown in FIG. 8). In the current layer 806 of FIG. 8, the broken lines indicate where the edges of the upsampled 6×6 blocks (e.g. blocks 804) would be. In one embodiment, any position of the current N×N block (e.g. any corner of the block) is chosen to be mapped to the base layer picture. When an N×N block may be aligned with multiple upsampled blocks from the base layer (e.g. block 810 shown in FIG. 8), reference index selection and motion vector selection may further apply.

In another embodiment, during motion field mapping, the prediction mode of the base layer block and the prediction mode of neighboring blocks may be set such that for any block in the upsampled frame, whether the block belongs to an intra predicted or inter predicted prediction unit is known.

In one embodiment, if the initial prediction mode of the base layer block is intra, after base layer upsampling, the intra mode is kept, and no motion field is upsampled for intra blocks. A coder may check whether the prediction mode of the base layer block is intra prediction mode. For example, the prediction module 100 of the video encoder 20 of FIG. 2 may perform such checking. If it is determined that the prediction mode of the base layer block is intra, the upsampling of the motion field information may be skipped. On the other hand, if it is determined that the prediction mode of the base layer block is not intra, the motion field of the base layer block is upsampled (e.g. by the upsampling module 130 of the video encoder 20 of FIG. 2), and a predicted value of the current block is determined based at least in part on the upsampled motion field of the base layer block. As discussed above, the determination of the predicted value of the current block may be performed by the prediction module 100 of the video encoder 20 of FIG. 2.

Alternatively, regardless of the initial base layer prediction mode, after base layer upsampling, inter prediction mode is assigned for all blocks with the upsampled motion field. In some embodiments, the motion field of the base layer block is upsampled (e.g. by the upsampling module 130 of the video encoder 20 of FIG. 2) regardless of the base layer prediction mode. In such embodiments, inter prediction mode may be assigned to all blocks having the upsampled motion field. Based at least in part on the upsampled motion field of the base layer block, a predicted value for the current block may be determined. The determination of the predicted value of the current block may be performed by the prediction module 100 of the video encoder 20 of FIG. 2.

During motion field upsampling, before assigning the motion field, in addition to current block prediction mode, the neighbor block prediction mode can be considered. The prediction mode can be converted to the prediction mode that is the most common mode associated with the neighboring blocks.

In some embodiments, the prediction mode of the upsampled video block associated with the upsampled motion field may be determined based on the prediction mode of at least one neighboring video block spatially adjacent to the upsampled video block. For example, if the current block is an intra block but the majority of its surrounding neighbor blocks have inter prediction mode, the mode of the current block can be set as inter and the upsampled motion field is assigned for this current block. In another example, if at least one of the neighbor block is inter predicted block then the current block prediction mode can be set as inter predicted block as well and upsampled motion field is also assigned. Based at least in part on the upsampled motion field of the base layer block, a predicted value for the current block may be determined. As discussed above, the determination of the prediction mode and the predicted value of the current block may be performed by the prediction module 100 of the video encoder 20 of FIG. 2.

In one alternative, in addition, if a current block in the upsampled picture corresponds to at least one pixel of a block (in the original picture) that is Intra coded, the current block is considered as Intra coded.

Figure 9:
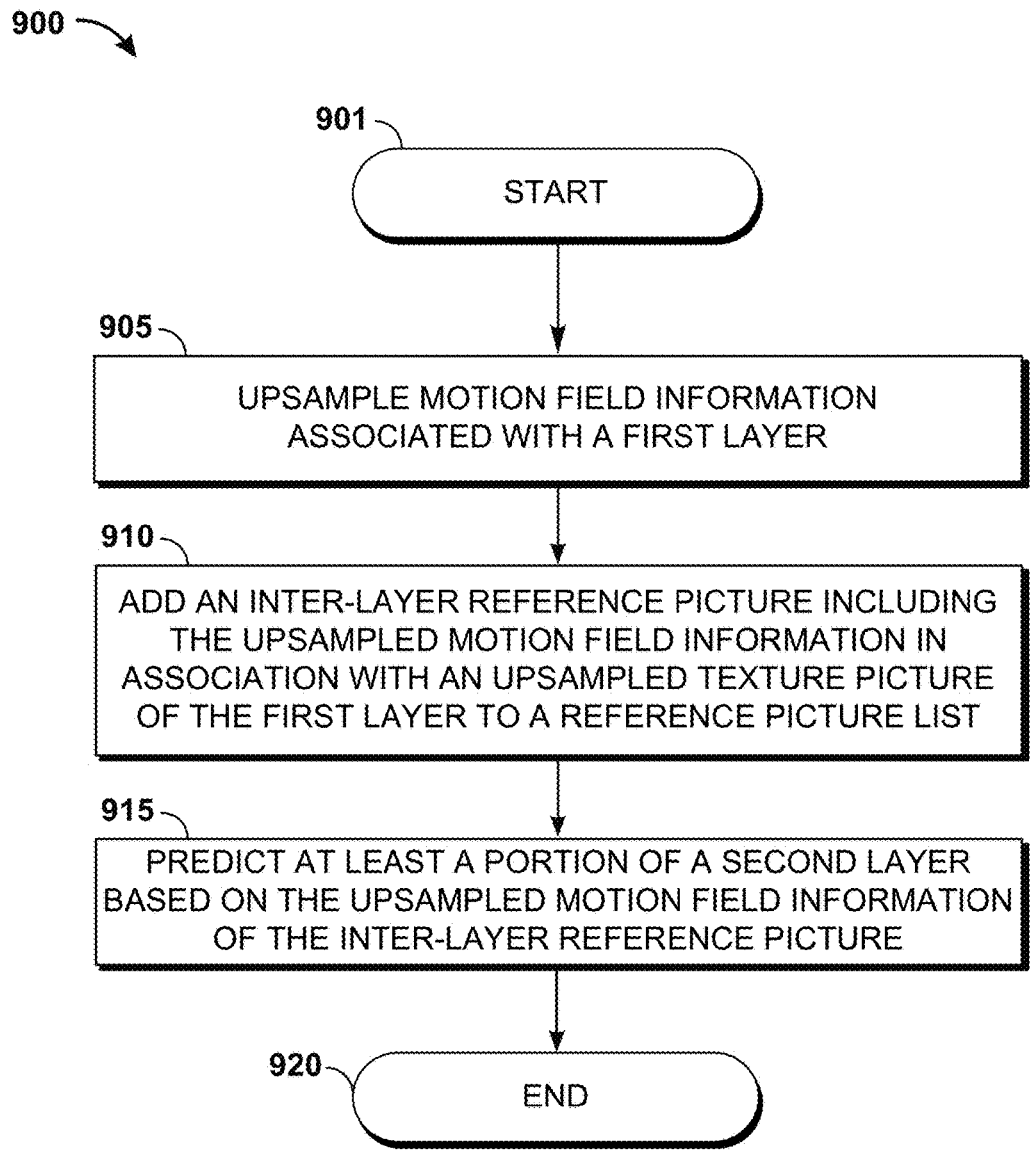
FIG. 9 is a flowchart illustrating a method for coding video information.

An example method 900 for coding video information according to an embodiment is illustrated in FIG. 9. The method 900 can be performed by one or more components of video encoder 20 or video decoder 30, including, but not limited to, inter prediction module 121, upsampling module 130, motion compensation module 162 or upsampling module 170. In some embodiments, other components may be used to implement one or more of the steps described herein. For example, the method 900 can be used to perform one or more of the actions described with respect to FIGS. 4-8. Although the steps of the method 900 are described as being performed by a coder, such steps may be performed by an encoder (e.g. video encoder 20) or a decoder (e.g. video decoder 30).

The method 900 begins at step 901. At step 905, motion field information associated with a first layer (e.g. base layer) is upsampled. The motion field information can include, for example, a set of motion vectors associated with the particular first layer and may also include inter direction, reference index or any other information relevant to motion estimation. The upsampling described herein may be scaling, resampling, or any other similar techniques. For example, the upsampling of the motion field information may match the upsampling of the texture picture of the first layer, such that both are upsampled according to the same spatial aspect ratio.

At step 910, the coder adds an inter-layer reference picture including the upsampled motion field information in association with the upsampled texture picture of the first layer. The inter-layer reference picture may simply be added to the reference picture list or replace an existing reference picture in the reference picture list.

At step 915, the coder predicts at least a portion of the second layer based on the upsampled motion field information of the inter-layer reference picture. For example, the coder may use the inter-layer reference picture for temporal motion vector prediction (TMVP). For example, a particular coding unit or prediction unit in the second layer may be predicted using the inter-layer reference picture added to the reference picture list. The method 900 ends at step 920.

In the above descriptions, block structure may have been used as an example. However the techniques, devices, and methods described herein may be used on pixels and instead of utilizing information associated with neighboring blocks, neighboring pixels may be utilized.

Implementation

There are additional techniques for deriving reference index and motion vector information when one block in a current layer corresponds to multiple blocks in a base layer. When the current N×N block is co-located with multiple upsampled blocks from the base layer, any one or more of several methods may be employed, as discussed below.

1. Reference Index Conversion

Since the base layer reference picture lists and the enhancement layer reference picture lists are not necessarily identical (in terms of the POC values of each entry), a reference index rIdxB of the base layer is converted to the reference index rIdxE of the enhancement layer if both correspond to pictures with the same POC value. If rIdxE does not exist, the base layer block is considered to be unavailable for the specific RefPicList0 or RefPicList1 direction.

A similar operation can also be performed when converting a reference index related to RefPicListX (with X equal to 0 or 1) at the base layer to a reference index related to RefPicListY (with Y equal to 1-X) at the enhancement layer.

In another embodiment, if rIdxE does not exist, a temporal reference picture (with e.g., the smallest reference index) may chosen for the MV in the base layer block to be scaled to, based on the POC distances. Further, rIdxB may be converted to another reference index in the base layer that is valid for the EL. In addition, encoder constraint on a bitstream may be imposed to avoid this problem.

In another embodiment, if the base layer block is bi-directional and one of the reference indices rIdxB is not valid, the MV can be converted to be uni-directional with a valid reference index instead of making the whole motion field unavailable.

In the description below, the reference index can be considered to have already been converted.

2. Inter Direction Based Selection

In one embodiment, a priority in terms of MV selection may be predefined by the inter direction. For example, if the current slice type is a B-slice, priority may be given to the block with bi-direction MV, meaning that the block which is bi-directional predicted has a better chance of being chosen to predict the current N×N block.

3. Location Priority Based Selection

In another embodiment, priority in terms of direction may be predefined, e.g., (i) first top, then left; (ii) first bottom, then right; or (iii) first top, then right. All the upsampled blocks intersecting with the current N×N block at the first direction boundary are firstly chosen. Then, the ones that intersect with the current N×N block at the second direction boundary are selected next. The full set of the motion information is set to be the motion information of the current N×N block.

4. Temporal Distance Based Selection

In one embodiment, among the upsampled blocks, the one which has the reference picture with the closest POC distance to the current picture is chosen to provide a full set of the motion information of the N×N block. This operation may be done separately for each prediction direction, corresponding to either RefPicList0 or RefPicList 1.

In another embodiment, if there are multiple upsampled blocks that contain a reference index referring to the same reference picture that has the closest POC distance, the following operations may be applied to further derive the motion vector: (1) average of the motion vectors is derived as the final motion vector; (2) medium of the motion vectors is derived as the final motion vector. In one embodiment, only up to 3 motion vectors are chosen for the medium operation.

5. Virtual Motion Vector Generation

In another embodiment, when one upsampled block contains a reference index and MV corresponding to RefPicListX (with X being equal to 0 or 1) but no available reference index to RefPicListY (with Y equal to 1-X), while the other block contains a reference index and MV corresponding to RefPicListY, the motion vectors of these two blocks may be used to form a full set of bi-predicted motion information.

In addition, when one upsampled block contains a reference index and MV corresponding to RefPicListX (with X being equal to 0 or 1) but no available reference index to RefPicListY (with Y equal to 1-X), while the other block contains a reference index (refIdxXB) and MV corresponding to RefPicListX, but to a picture that is the same as one reference picture in RefPicListY, the motion vector of the other block is used to form a full set of bi-predicted motion information, with refIdxXB converted to refIdxYB', which corresponds to a picture identified by refIdxXB in RefPicListX.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, comprising:
   a memory configured to store video data associated with a first layer having a first spatial resolution and a corresponding second layer having a second spatial resolution, wherein the first spatial resolution is less than the second spatial resolution, the video data including at least motion field information associated with the first layer; and
   a processor in communication with the memory, the processor configured to:
   for each respective block of an inter-layer reference picture usable to predict the second layer and having a plurality of blocks:
      determine whether a corresponding portion of the first layer corresponding to the respective block is intra coded; and
      perform one of (i) based on a determination that the corresponding portion of the first layer is intra coded, set a coding mode associated with the respective block of the inter-layer reference picture to be an intra mode, and (ii) based on a determination that the corresponding portion of the first layer is not intra coded, upsample motion field information associated with the corresponding portion of the first layer and associate the upsampled motion field information with the respective block;

add the inter-layer reference picture to a reference picture list to be used for inter prediction of at least a portion of the second layer; and predict at least a portion of the second layer based on the inter-layer reference picture, wherein for each N×N block in the second layer, the processor is configured to:

map a center position to a unique position in the first layer, and derive motion field information of the entire N×N block in the second layer from the upsampled motion field information associated with the unique position in the first layer, wherein N can be at least 16, wherein each N×N block in the second layer has a particular co-located N×N block in the inter-layer reference picture, the particular N×N block having a co-located block in the first layer from which the motion field information is up sampled for the particular N×N block of the inter-layer reference picture.

2. The apparatus of claim 1, wherein the processor is further configured to use the inter-layer reference picture as a co-located picture for determining a motion vector to be used for predicting the second layer.

3. The apparatus of claim 1, wherein the motion field upsampling is performed separately for each 4×4 block of the inter-layer reference picture.

4. The apparatus of claim 1, wherein the motion field information of the first layer is compressed based on High Efficiency Video Coding (HEVC) motion compression.

5. The apparatus of claim 1, wherein the upsampling of the motion field information comprises associating at least one of a coding tree, a coding unit, a prediction unit, a mode, an intra mode, or an inter mode with the inter-layer reference picture.

6. The apparatus of claim 1, wherein the processor is further configured to derive up to two motion vectors, each associated with a reference index, in connection with upsampling the motion field information.

7. The apparatus of claim 1, wherein an inter mode is assigned to one or more blocks in the inter-layer reference picture.

8. The apparatus of claim 1, wherein all N×N blocks of the first layer are upsampled with a ratio equal to a ratio of the second spatial resolution to the first spatial resolution.

9. The apparatus of claim 1, wherein the processor is further configured to assign an inter mode to a particular block in the inter-layer reference picture based on a determination that a co-located block in the first layer is intra coded, and that a majority of neighboring blocks of the co-located block are each inter coded.

10. The apparatus of claim 1, wherein the processor is further configured to upsample no motion field information for a particular block in the inter-layer reference picture based on a determination that a co-located block of the particular block in the first layer is intra coded.

11. The apparatus of claim 1, wherein the processor is further configured to upsample no motion field information for a particular block in the inter-layer reference picture based on a determination that a co-located block of the particular block in the first layer has at least one pixel that belongs to a block in the first layer that is intra coded.

12. A method of encoding video information, the method comprising:

receiving video data associated with a first layer having a first spatial resolution and a corresponding second layer having a second spatial resolution, wherein the first spatial resolution is less than the second spatial resolution, the video data including at least motion field information associated with the first layer;

for each respective block of an inter-layer reference picture usable to predict the second layer and having a plurality of blocks:

determining whether a corresponding portion of the first layer corresponding to the respective block is intra coded; and performing one of (i) based on determining that the corresponding portion of the first layer is intra coded, setting a coding mode associated with the respective block of the inter-layer reference picture to be an intra mode, or (ii) based on determining that the corresponding portion of the first layer is not intra coded, upsampling motion field information associated with the corresponding portion of the first layer and associate the upsampled motion field information with the respective block;

adding the inter-layer reference picture to a reference picture list to be used for inter prediction of at least a portion of the second layer;

predicting at least a portion of the second layer based on the inter-layer reference picture; and signaling at least one syntax element associated with the second layer in a bitstream, wherein for each N×N block in the second layer:

mapping a center position to a unique position in the first layer, and deriving motion field information of the entire N×N block in the second layer from the upsampled motion field information associated with the unique position in the first layer, wherein N can be at least 16, wherein each N×N block in the second layer has a particular co-located N×N block in the inter-layer reference picture, the particular N×N block having a co-located block in the first layer from which the motion field information is up sampled for the particular N×N block of the inter-layer reference picture.

13. The method of claim 12, further comprising using the inter-layer reference picture as a co-located picture for determining a motion vector to be used for predicting the second layer.

14. The method of claim 12, wherein the motion field upsampling is performed separately for each 4×4 block of the inter-layer reference picture.

15. The method of claim 12, wherein the motion field information of the first layer is compressed based on High Efficiency Video Coding (HEVC) motion compression.

16. The method of claim 12, wherein the upsampling of the motion field information comprises associating at least one of a coding tree, a coding unit, a prediction unit, a mode, an intra mode, or an inter mode with the inter-layer reference picture.

17. The method of claim 12, further comprising deriving up to two motion vectors, each associated with a reference index, in connection with upsampling the motion field information.

18. The method of claim 12, wherein an inter mode is assigned to one or more blocks in the inter-layer reference picture.

19. The method of claim 12, wherein all N×N blocks of the first layer are upsampled with a ratio equal to a ratio of the second spatial resolution to the first spatial resolution.

20. The method of claim 12, further comprising assigning an inter mode to a particular block in the inter-layer reference picture based on determining that a co-located block in the first layer is intra coded and that a majority of neighboring blocks of the co-located block are each inter coded.

21. The method of claim 12, further comprising upsampling no motion field information for a particular block in the inter-layer reference picture based on determining that a co-located block of the particular block in the first layer is intra coded.

22. The method of claim 12, further comprising upsampling no motion field information for a particular block in the inter-layer reference picture based on determining that a co-located block of the particular block in the first layer has at least one pixel that belongs to a block in the first layer that is intra coded.

23. A method of decoding video information, the method comprising:
 receiving syntax elements extracted from an encoded video bitstream, wherein the syntax elements comprise video data associated with a first layer having a first spatial resolution and a corresponding second layer having a second spatial resolution, wherein the first spatial resolution is less than the second spatial resolution, the video data including at least motion field information associated with the first layer;
 for each respective block of an inter-layer reference picture usable to predict the second layer and having a plurality of blocks:
  determining whether a corresponding portion of the first layer corresponding to the respective block is intra coded; and
  performing one of (i) based on determining that the corresponding portion of the first layer is intra coded, setting a coding mode associated with the respective block of the inter-layer reference picture to be an intra mode, or (ii) based on determining that the corresponding portion of the first layer is not intra coded, upsampling motion field information associated with the corresponding portion of the first layer and associate the upsampled motion field information with the respective block;
 adding the inter-layer reference picture to a reference picture list to be used for inter prediction of at least a portion of the second layer; and
 predicting at least a portion of the second layer based on the inter-layer reference picture,
 wherein for each N×N block in the second layer:
  mapping a center position to a unique position in the first layer, and
  deriving motion field information of the entire N×N block in the second layer from the upsampled motion field information associated with the unique position in the first layer, wherein N can be at least 16, wherein each N×N block in the second layer has a particular co-located N×N block in the inter-layer reference picture, the particular N×N block having a co-located block in the first layer from which the motion field information is up sampled for the particular N×N block of the inter-layer reference picture.

24. The method of claim 23, further comprising using the inter-layer reference picture as a co-located picture for determining a motion vector to be used for predicting the second layer.

25. The method of claim 23, wherein the motion field upsampling is performed separately for each 4×4 block of the inter-layer reference picture.

26. The method of claim 23, wherein the motion field information of the first layer is compressed based on High Efficiency Video Coding (HEVC) motion compression.

27. The method of claim 23, wherein the upsampling of the motion field information comprises associating at least one of a coding tree, a coding unit, a prediction unit, a mode, an intra mode, or an inter mode with the inter-layer reference picture.

28. The method of claim 23, further comprising deriving up to two motion vectors, each associated with a reference index, in connection with upsampling the motion field information.

29. The method of claim 23, wherein an inter mode is assigned to one or more blocks in the inter-layer reference picture.

30. The method of claim 23, wherein all N×N blocks of the first layer are upsampled with a ratio equal to a ratio of the second spatial resolution to the first spatial resolution.

31. The method of claim 23, further comprising assigning an inter mode to a particular block in the inter-layer reference picture based on determining that a co-located block in the first layer is intra coded and that a majority of neighboring blocks of the co-located block are each inter coded.

32. The method of claim 23, further comprising upsampling no motion field information for a particular block in the inter-layer reference picture based on determining that a co-located block of the particular block in the first layer is intra coded.

33. The method of claim 23, further comprising upsampling no motion field information for a particular block in the inter-layer reference picture based on determining that a co-located block of the particular block in the first layer has at least one pixel that belongs to a block in the first layer that is intra coded.

34. A non-transitory computer readable medium comprising code that, when executed, causes an apparatus to:
 store video data associated with a first layer having a first spatial resolution and a corresponding second layer having a second spatial resolution, wherein the first spatial resolution is less than the second spatial resolution, the video data including at least motion field information associated with the first layer;
 for each respective block of an inter-layer reference picture usable to predict the second layer and having a plurality of blocks:
  determine whether a corresponding portion of the first layer corresponding to the respective block is intra coded; and
  perform one of (i) based on a determination that the corresponding portion of the first layer is intra coded, set a coding mode associated with the respective block of the inter-layer reference picture to be an intra mode, and (ii) based on a determination that the corresponding portion of the first layer is not intra coded, upsample motion field information associated with the corresponding portion of the first layer and associate the upsampled motion field information with the respective block;

add the inter-layer reference picture to a reference picture list to be used for inter prediction of at least a portion of the second layer; and predict at least a portion of the second layer based on the inter-layer reference picture, wherein for each N×N block in the second layer, the code, when executed, further causes the apparatus to:

map a center position to a unique position in the first layer, and derive motion field information of the entire N×N block in the second layer from the upsampled motion field information associated with the unique position in the first layer, wherein N can be at least 16, wherein each N×N block in the second layer has a particular co-located N×N block in the inter-layer reference picture, the particular N×N block having a co-located block in the first layer from which the motion field information is up sampled for the particular N×N block of the inter-layer reference picture.

35. The medium of claim 34, wherein the code, when executed, further causes the apparatus to use the inter-layer reference picture as a co-located picture for determining a motion vector to be used for predicting the second layer.

36. The medium of claim 34, wherein the upsampling of the motion field information comprises associating at least one of a coding tree, a coding unit, a prediction unit, a mode, an intra mode, or an inter mode with the inter-layer reference picture.

37. The medium of claim 34, wherein the code, when executed, further causes the apparatus to assign an inter mode to a particular block in the inter-layer reference picture based on a determination that a co-located block in the first layer is intra coded and that a majority of neighboring blocks of the particular block are each inter coded.

38. A video coding device configured to code video information, the video coding device comprising:

means for storing video data associated with a first layer having a first spatial resolution and a corresponding second layer having a second spatial resolution, wherein the first spatial resolution is less than the second spatial resolution, the video data including at least motion field information associated with the first layer;

means for performing, for each respective block of an inter-layer reference picture usable to predict the second layer and having a plurality of blocks:

determining whether a corresponding portion of the first layer corresponding to the respective block is intra coded; and performing one of (i) based on determining that the corresponding portion of the first layer is intra coded, setting a coding mode associated with the respective block of the inter-layer reference picture to be an intra mode, and (ii) based on determining that the corresponding portion of the first layer is not intra coded, upsampling motion field information associated with the corresponding portion of the first layer and associate the upsampled motion field information with the respective block;

means for adding the inter-layer reference picture to a reference picture list to be used for inter prediction of at least a portion of the second layer;

means for predicting at least a portion of the second layer based on the inter-layer reference picture, and for each N×N block in the second layer:

means for mapping a center position to a unique position in the first layer, and means for deriving motion field information of the entire N×N block in the second layer from the upsampled motion field information associated with the unique position in the first layer, wherein N can be at least 16, wherein each N×N block in the second layer has a particular co-located N×N block in the inter-layer reference picture, the particular N×N block having a co-located block in the first layer from which the motion field information is upsampled for the particular N×N block of the inter-layer reference picture.

39. The device of claim 38, further comprising means for using the inter-layer reference picture as a co-located picture for determining a motion vector to be used for predicting the second layer.

40. The device of claim 38, wherein the upsampling of the motion field information comprises associating at least one of a coding tree, a coding unit, a prediction unit, a mode, an intra mode, or an inter mode with the inter-layer reference picture.

41. The device of claim 38, further comprising means for assigning an inter mode to a particular block in the inter-layer reference picture based on a determination that a co-located block in the first layer is intra coded and that a majority of neighboring blocks of the particular block are each inter coded.

* * * * *